United States Patent Office 2,862,989
Patented Dec. 2, 1958

2,862,989

ALKALINE CELLS AND METHODS OF STORING THEM

Howard J. Strauss, Philadelphia, Pa., assignor to The Electric Storage Battery Company, a corporation of New Jersey No Drawing. Application February 17, 1955
Serial No. 488,985

1 Claim. (Cl. 136—161)

This invention relates to electric batteries of the hermetically sealed type and has for an object the provision of a method of and means for producing and maintaining electric batteries at full charge with a minimum of maintenance being required, each battery being available for instant use over long periods of time.

This invention is particularly applicable to batteries of the alkaline type, particularly those including silver electrodes or positive plates and zinc electrodes or negative plates. It is well known that silver-zinc cells have in the past had a relatively short shelf-life. If a cell retains 80% of its charge over a 30-day period, it has heretofore been considered satisfactory. To extend shelf-life, it has heretofore been proposed (Vinal, "Primary Batteries," third edition, 1950, page 273) to provide between the electrodes a tight packing of asbestos fiber. A longer resultant shelf-life is obtained but at the expense of a loss in the capacity of the cell for discharge at high current rates and a loss in volumetric performance.

It is a further object of the present invention to maintain silver-zinc cells at full charge over extended periods of time without loss of charge and without impairment of current discharge capabilities.

In carrying out the invention in one form thereof, the silver-zinc cells or batteries are hermetically sealed, as for example, in the manner disclosed and claimed by me in my copending application Serial No. 460,679, filed October 6, 1954. More particularly, each cell of the battery is initially purged by oxygen which is introduced into the cell from a suitable source. Each cell is provided with a vent. After flow of oxygen for a short period of time, the cell is sealed. In this manner, atmospheric gases other than oxygen are reduced to a low value, with the result that the gas pressure within the cell approximates, is substantially equal to, the partial pressure of oxygen within the cell. After formation of the plates to provide a full charge of the positive plates, a floating current of a low order of magnitude is passed through the cells in the charging direction. It has been found that the application of such a floating current produces new and unexpected results in maintaining the health of the cell over an extended period of time. After an extended period of time, at least thirty days, cells have been discharged without significant loss of capacity either in terms of initial high discharge rate or in volumetric performance. Where the charging rate for such cells might range from 2 to 20 amperes, the floating current need be but of the order of 150 milliamperes. Floating currents, smaller and larger than the stated figure, can be and have been used, it being understood that the magnitude of the floating current is not critical. Ordinarily, the lower current values will be selected for the purpose already set forth and hereinafter to be more fully explained.

All of the reasons for loss of capacity of the cell are not known, and it is doubted that all of the mechanisms involved have been identified. Nevertheless, the experimental work which I have done, taken in conjunction with the results achieved, lead me to believe that the loss in capacity heretofore existing has in part been due to loss in the negative capacity of the cell. Apparently at the negative plates there is conversion of zinc to zinc oxide. When a cell is not hermetically sealed, there is not only absorption from the atmosphere of carbon dioxide which increases the electrical resistance of the cell, but also there is some absorption of oxygen which contributes to the oxidation of the zinc.

Further in accordance with the present invention, whenever overcharge conditions prevail at the positive plates with resultant production of oxygen, provisions are made favorable for the following reaction to occur at the negative plates:

$$O_2 + H_2O + 4 \text{ electrons} \rightarrow 4OH^- \qquad (1)$$

Conditions within the cell or battery are also established which are unfavorable to the following reaction:

$$O_2 + 2Zn + 2H_2O \rightarrow 2Zn(OH)_2 \qquad (2)$$

If this Reaction 2 were to occur as the result of absorption of atmospheric oxygen, the result would be depletion of the zinc electrode. By sealing the cell, I have found the Reaction 2 does not tend to occur.

Reaction 1 is favored by reason of the floating current which is maintained during storage of the cells. The physical arrangements later described also aid in producing the conditions favorable to the occurrence of Reaction 1 as against the following reaction at the negative electrode.

$$K^+ + H_2O + 2e \rightarrow 2KOH + H_2 \qquad (3)$$

The use of a floating current also minimizes the possibility of short circuits arising from zinc trees. If zinc is permitted to form zinc oxide (as in Reaction 2) and is permitted to plate out at the zinc electrode in the form of protrusions or "trees," they may extend into electrical contact with the positive electrodes to short-circuit the cell. If the zinc oxide remains in the cell for any length of time, it appears to concentrate at particular locations, as at the lower portion of the cell. By maintaining the floating current, there is prevented the dissolution of zinc in the electrolyte in the form of zinc oxide and also the accumulation of zinc at the lower portion of the cell. Thus, the deleterious effects of treeing are not realized since the zinc growths are to large degree inhibited.

Further in connection with the sealing of the cell, it is desirable to provide an oxygen-saturated electrolyte and an oxygen atmosphere within the sealed battery. In this manner the partial pressure of gases other than oxygen within the cell is reduced to an exceedingly low value, approaching zero as a limit. Since the gas pressure within the sealed cell will then approximate the partial pressure of oxygen, there are provided conditions for maximum solubility of the oxygen in the electrolyte and a minimum gas pressure within the cell. More particularly, the fraction of gas pressure within the cell due solely to oxygen may be less than atmospheric pressure; it may be as low or lower than a fifth of the atmospheric pressure. It is only important that the partial pressure of oxygen be high as compared with the partial pressure of other gases within the cell. My experimental work indicates that a cell may be operated at subatmospheric pressure if gases other than oxygen are excluded from the cell at the time of sealing.

Further in accordance with the invention, there are desirable physical arrangements of the parts. A close spacing between the positive plates and the negative plates is provided.

For the primary silver-zinc cell a porous and absorptive separator is inserted between the positive and negative plates with a part of the separator protruding above the electrodes and the electrodes themselves protruding above the electrolyte.

For a secondary cell the diaphragm or separator, of regenerated cellulose, generally has a low rate of gas transfer therethrough. Accordingly, in secondary cells it will be highly desirable to provide between the portions of the electrodes protruding above the electrolyte level a porous, gas-permeable membrane, such as absorptive papers or gas-permeable filters. During recharging, the electrolyte level is maintained below the porous permeable membrane to prevent short circuits.

What is claimed is:

In the storage of sealed electric batteries of the silver-zinc type in a charged wet condition, the method which comprises introducing oxygen into the container prior to sealing the same to increase the partial pressure of oxygen within the container to a value approaching as a limit the total gas pressure within the container, sealing the container with an oxygen atmosphere above the electrolyte therein, and passing through said battery in a charging direction a current sufficient to just maintain the battery in a charged condition.

References Cited in the file of this patent

UNITED STATES PATENTS

| | | |
|---|---|---|
| 2,578,027 | Tichenor | Dec. 11, 1951 |
| 2,594,711 | Andre | Apr. 29, 1952 |

OTHER REFERENCES

Vinal: "Storage Batteries," third edition, 1940, pages 250 and 251.